ance* May 1926, pp. 377–380, "A Simple Model for Illustrating the Atomic Arrangements in Crystals".

United States Patent [19]
Smith

[11] 4,416,635
[45] Nov. 22, 1983

[54] MOLECULAR MODELS

[75] Inventor: Graham M. Smith, Scotch Plains, N.J.

[73] Assignee: Merck & Co., Inc., Rahway, N.J.

[21] Appl. No.: 334,196

[22] Filed: Dec. 24, 1981

[51] Int. Cl.$^3$ ............................................. G09B 23/26
[52] U.S. Cl. ...................................... 434/280; 434/152
[58] Field of Search ............. 434/152, 269, 277, 278, 434/279, 280, 281; 273/1 GG

[56] References Cited

U.S. PATENT DOCUMENTS

| | | | |
|---|---|---|---|
| 3,137,080 | 6/1964 | Zang | 434/152 |
| 3,168,311 | 2/1965 | Sinden | 273/1 GG |
| 3,802,097 | 4/1974 | Gluck . | |
| 3,854,223 | 12/1974 | Dingman . | |
| 3,903,616 | 9/1975 | Gage . | |
| 3,939,581 | 2/1976 | Clarke . | |
| 4,020,566 | 5/1977 | Dreiding . | |
| 4,030,209 | 6/1977 | Dreiding . | |
| 4,371,345 | 2/1983 | Palmer | 434/269 |

FOREIGN PATENT DOCUMENTS

| | | | |
|---|---|---|---|
| 1099406 | 3/1955 | France | 434/152 |
| 2368101 | 6/1978 | France | 434/152 |

OTHER PUBLICATIONS

Wyckoff, Ralph W. G. et al., *American Journal of Science*, May 1926, pp. 377–380, "A Simple Model for Illustrating the Atomic Arrangements in Crystals".

*Primary Examiner*—Harland S. Skogquist
*Attorney, Agent, or Firm*—Thomas E. Arther; Hesna J. Pfeiffer

[57] ABSTRACT

A molecular model of a relatively large molecule or a portion thereof is made up of a series of solid parallel and equidistant cross sections of rigid transparent plastic sheets representing space occupied by the atoms in the crystalline state. The adjacent cross sections are generated from x-ray crystal spectroscopic data providing crystal coordinates of the large molecules in computer readable form. Computer tapes of such data are used to print out numbered cross sections of the molecule showing coordinate plots of atoms intersecting such cross sections along a preselected coordinate axis. These cross sections are duplicated manually in clear rigid plastic sheets and assembled in order using appropriate spacer blocks to maintain accurate spacing of the adjacent cross section.

2 Claims, 5 Drawing Figures

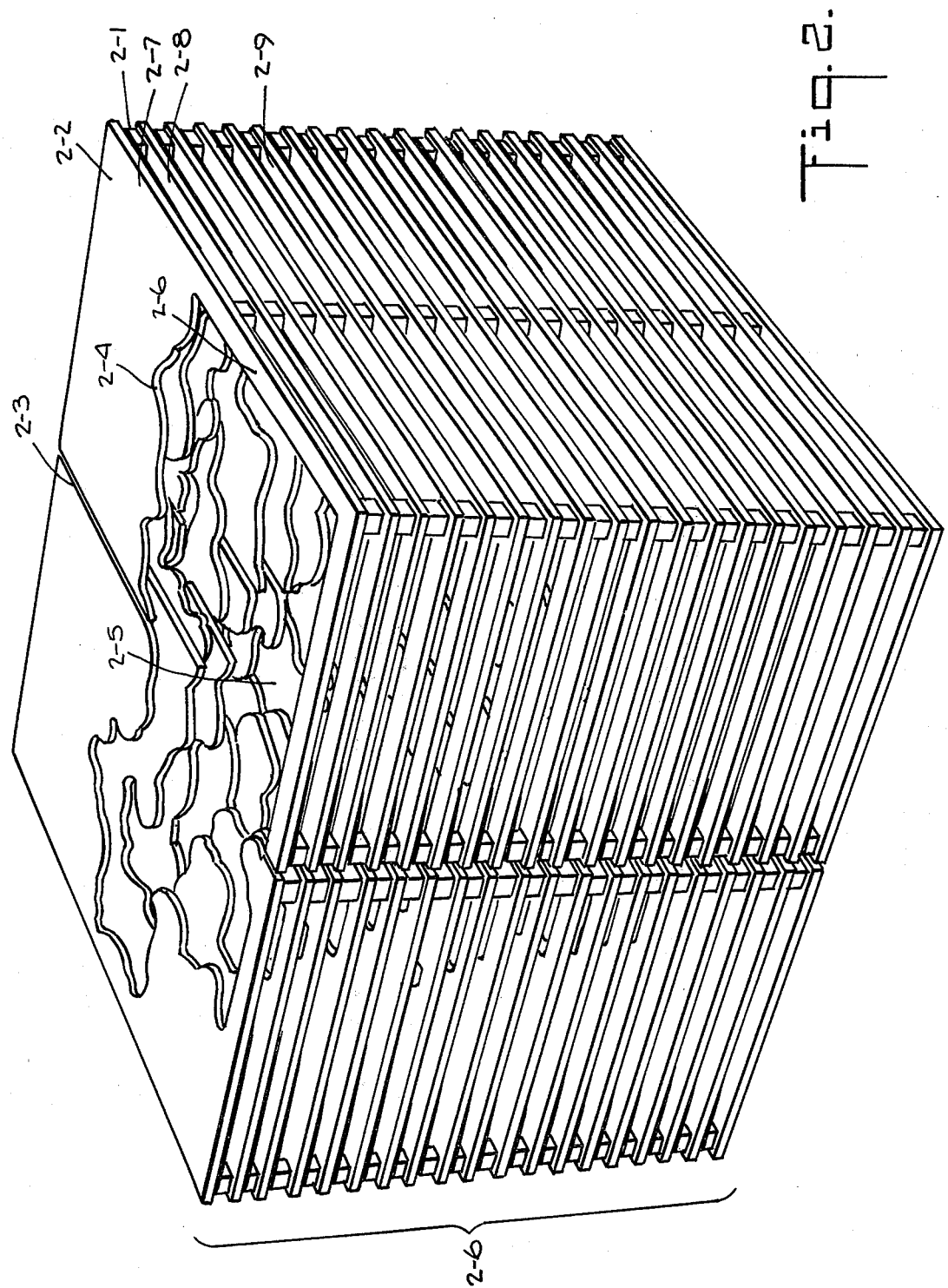

MOLECULAR MODELS

BACKGROUND OF THE INVENTION

A number of different types of molecular model construction are known and are used for the demonstration of chemical molecular structure and to study the interaction between a large molecule such as an enzyme and its substrate. Many of the models currently in use are the well known—ball and stick models in which balls representing atoms are connected by rigid or flexible connectors representing valence bonds.

Using such models it is possible by tedious manual construction to assemble space filling representations of molecules. Other models currently in use include space filling atoms such as the well-known Corey-Pauling-Koltun (CPK) components which are made up of individual components fabricated of plastic or other rigid material representing the space filling nature of individual atoms on a scale of 1.25 cm/angstrom. These models must also be individually assembled from the construction units representing single atoms, involving tedious manual manipulation by highly skilled personnel.

SUMMARY OF THE INVENTION

The present invention comprises space filling molecular models consisting of a series of stacked, relatively thin rigid sheets of plastic or similar material separated by spacer blocks cut out to represent individual cross sections of the molecule said rigid plastic sheets representing the space filling nature of the atoms contained therein. For convenience, generally only the portion of the molecule which is of interest is reproduced. The invention also includes the method of designing and constructing such models using existing data of compounds having known molecular structures, using digital computers interfaced with appropriate visual display units and other selected input and output devices. The data used is obtained from laboratories which examine crystalline substances of known structure by x-ray spectroscopy and is stored on computer readable magnetic tapes. The data from the tapes is then stored in the memory system of a general purpose electronic digital computer. The computer when coupled with appropriate output devices permits visualization of the molecular structure and plotting of individual cross sections of the molecule along a preselected axis. The cross-section plots thus produced are circles spaced to represent individual atoms whose radii intersect the particular plane or cross section involved. The contour of the space filling nature of the atoms is drawn by connecting the atomic radii outlining open space in the cross section. The contour map thus produced is transferred to a rigid sheet of plastic and the portion representing empty space is cut out of the plastic. The adjacent cross sections are then stacked with appropriately sized spacers to produce a 3-dimensional model of stacked plastic sheets representing the shape of the space filling nature of the molecule as well as defining the outer surface contours of the molecule.

BRIEF DESCRIPTION OF DRAWINGS

FIG. 2 is a perspective view of the space filling nature of the atoms in a partial molecular model of the Rhizopus acid proteinase enzyme molecule showing planes number 30-38 of the total planes produced by the Zeta plotter.

DESCRIPTION OF THE INVENTION

Figure 5:
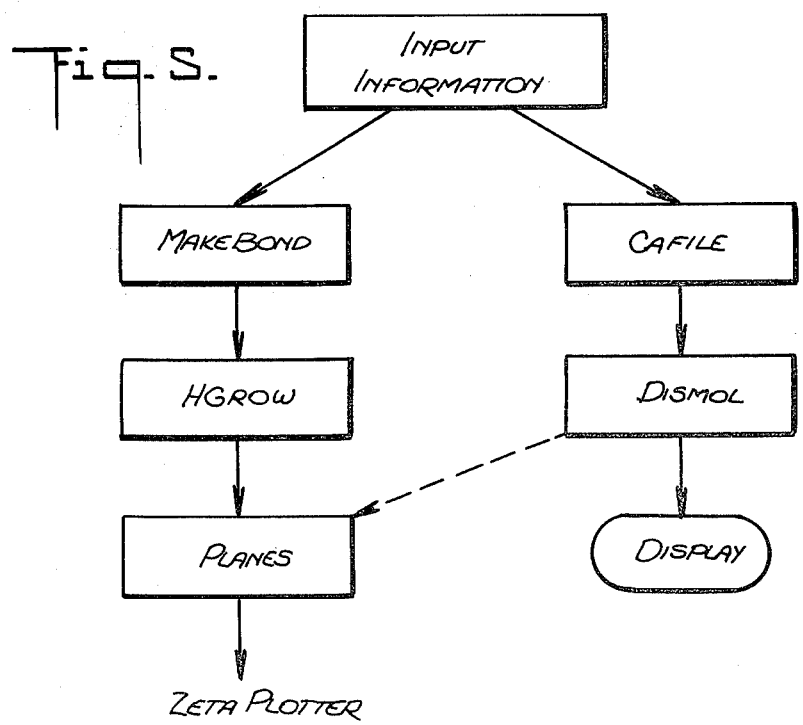
FIG. 5 is a system flow diagram of the processing of stored information to produce automatic plotting of scaled up molecular cross section planes.

The present invention presents a new type of space filling molecular model which approximates the construction scale of the well-known CPK models. It also relates to a system for constructing such models or selected portions thereof using the information available from laboratories such as the Brookhaven National Laboratory including spatial coordinates of individual atoms of a preselected molecule on computer readable magnetic tape. The system is described in the block diagram of FIG. 5 as follows:

The information obtained on computer readable tapes containing spatial coordinates of individual atoms of a preselected molecule is transferred to the memory system of an available general purpose electronic digital computer where it is identified as INPUT INFORMATION. This INPUT INFORMATION is processed using the MAKEBOND program to locate individual atoms and the bonding type and subsequently the output of the MAKEBOND program is processed with the HGROW program to insert information concerning location of hydrogen atoms. The INPUT INFORMATION is alternately processed sequentially with the CAFILE program and the DISMOL to display a visual representation of the molecule on a video screen. Using the visual display, the coordinates are obtained which are required for the PLANES program. Using the output of the HGROW it is further processed with the PLANES program using the orientation selected from the video DISPLAY screen interfaced with the ZETA PLOTTER which produces paper plots of molecular cross-section planes along a preselected axis at intervals of 1 angstrom on a scale of 1 angstrom:1.25 inches.

The models of the present invention may be used in conjunction with other conventional space filling models of smaller molecules to study the spatial interaction or compatibility of a large molecule such as an enzyme and the proposed substrate molecule. The scale of construction of the models of the present invention is compatible with the scale of the CPK models which is approximately 1.25 cm/angstrom.

A preferred method of model construction involves identification and construction of the portion of the enzyme molecule containing the presumed "active" site, i.e., the portion of the molecule which is believed to bind a substrate or inhibitor molecule.

An important feature of selecting a potential candidate for inhibition or activation of an enzyme is the geometry of the substrate molecule relative to the geometry of the "active" site of the enzyme. Thus, in order to modify the activity of the enzyme molecule, it is believed that the substrate molecule must first be of such a space filling size and shape that it will "fit" an active site in the enzyme molecule.

DESCRIPTION OF PREFERRED EMBODIMENT

In accordance with the present invention the data from x-ray spectroscopy of a preselected crystalline enzyme, Rhizopus acid proteinase, is obtained from a publicly available source such as the Brookhaven National Laboratory. This input data is provided along with other information as computer readable magnetic tapes and includes geometric coordinates of atoms within the molecule. The data available from such magnetic tapes is transferred by conventional peripheral computer hardware to the memory bank of any general purpose electronic digital computer such as International Business Machine System 370. The information stored in memory is then further processed to add further molecular structural detail to the information input from the publicly available magnetic tape. This input gives coordinates for the amino acid residues of the enzyme molecule and must be further processed to add necessary informational detail to locate individual atoms and their method of bonding as well as adding appropriate hydrogen atoms to complete the structural information using the MAKEBOND and the HGROW programs listed at the end of the specification.

The stored information is then processed to orient the features of the molecule which it is desired to reproduce and to plot the coordinates of the atoms on each selected cross section in the following manner.

The stored memory information is then processed manually using a Test Editor to extract from memory, data designating individual atoms, their individual sequence, the atom type, the amino acid residue type and residue number as well as the geometric coordinates of the individual atoms.

The feature of the enzyme molecule that is of interest is identified in a system employing a video display screen interfaced with a digital computer which accepts the input from the stored data. One such computer which has been used is identified as a Vax 11/780 computer supplied by Digital Equipment Inc. and the multipicture system by Evans and Sutherland Co., Inc. The C-alpha representation of the enzyme is displayed by first processing the stored data memory with the CAFILE program.

The output of the CAFILE program is then processed with the DISMOL program whereby the C-alpha representation of the enzyme molecule is displayed on the video screen. The C-alpha representation displayed is then rotated to present the axis of the selected feature of the molecule parallel to the Z-axis as viewed on the video screen. The X, Y, and Z rotations are then recorded for use in the PLANES program which controls the actual plotting of the cross section planes on paper.

Figure 4:
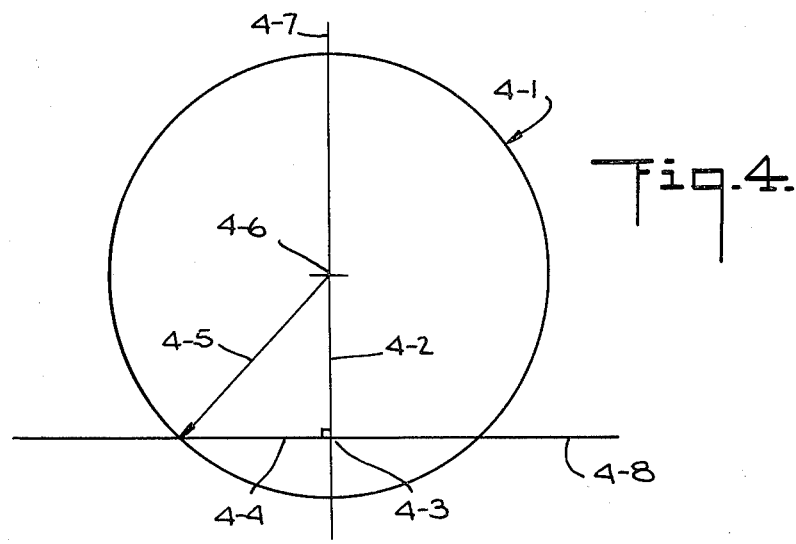
FIG. 4 is a view showing an atom intersecting a plane of the molecule to illustrate the principle of calculation used in the planes program.

The data contained in computer memory obtained from the output of the MAKEBOND and the HGROW programs is then processed by means of the "PLANES" program with insertion of the rotation information as required by the program. The principle of the PLANES program is explained by reference to FIG. 4 which illustrates the method of calculating the intersection of each atom with each plane. The outer surface of an atom (4-1) is shown as intersecting the surface of the plane $Z_p$(4-8). The locus of the center of the atom $(X_A Y_A Z_A)$(4-6) is said to be at a distance $D_Z = Z_A - Z_p$(4-2) from the center of the circle of intersection (4-3) $X_c = X_A$, $Y_c = Y_A$, $Z_c = Z_p$. The radius of the circle of intersection (4-4) of the atom with the plane $Z_p$ is identified as $(R_c)$. The radius of the atom (4-5) $R_A$ having its center on 4-7, the Z axis is used as described in the following mathematical expression:

$$Rc = \sqrt{R_A^2 - D_Z^2}$$

In order to plot the sequential cross sections the program is set for 1.0 Angstrom spacing and interfaced with an output device known as a ZETA plotter whereby circles approximating space occupied by each atom intersecting the plane are plotted and identified with atom type and serial order number. The plotting requires approximately 8–10 hours and produces the entire enzyme molecule plotted as cross section planes spaced 1 Angstrom apart. Other models can be plotted in similar manner using appropriate sources of stored data.

The next step in the model construction is production of the individual cross section planes. Although it is possible to produce the entire molecule as a space filling model, it is preferred to produce only that portion containing the "active site" of the molecule. This section should include the portion of adjacent cross sectional planes which contain the key residues at the active site and those residues which line the surface of the site. These residues may be identified by visual inspection of the molecular display referred to hereinabove and the particular layers may be identified by hand searching of the individual plots or by use of the "PLANES" program referred to hereinabove. This complete process is graphically depicted in the system flow diagram of FIG. 5 described as follows:

The data contained in computer memory input information is processed with the MAKEBOND program to locate individual atoms and their type of bonding and then is further processed using the HGROW programs to insert hydrogen atoms as required by the structural information stored in the output of the MAKEBOND program. In order to obtain the geometric coordinates used in the PLANES program, the input information is processed with the CAFILE program to obtain the c-alpha configuration and the output is processed with the DISMOL program whereby the c-alpha representation of the enzyme molecule is displayed on a video screen. The orientation information obtained is then used in conjunction with the output of the HGROW program to operate a ZETA plotter to print out 1A cross-section of the entire enzyme molecule along preselected coordinates.

In a preferred method of operation the adjacent cross sections containing the active site are identified and selected along with the residues which line the surface of the active site. It has been found that a preferred partial model can be prepared by marking out verticlly aligned 12" squares containing that portion of the molecule containing the active site. The marked sections of the plots are duplicated in transparent plastic sheets. The preferred material of construction is a 12" square of ½ inch plexiglass marked to maintain axial alignment. For ease of construction the squares are each split into two halves before duplicating the rectangular paper plots in plastic. One method of duplicating the selected squares is to align the paper plot marked rectangle over the plastic sheet and transfer the contour of the atoms to the plastic using carbon paper to mark the outline on the plastic. The orientation is also marked on the plastic so that the adjacent cross sections can be axially aligned.

The adjacent sections are then assembled using approximately 10⅜" cubes of plastic as spacers between layers, which maintains an actual distance between planes of ½", satisfying the preferred model scale of 1 angstrom:1.25 cm. The spacers are glued preferably to the bottom of each plane, and the planes stacked as shown in FIG. 1 for the first 2 planes.

Figure 1:
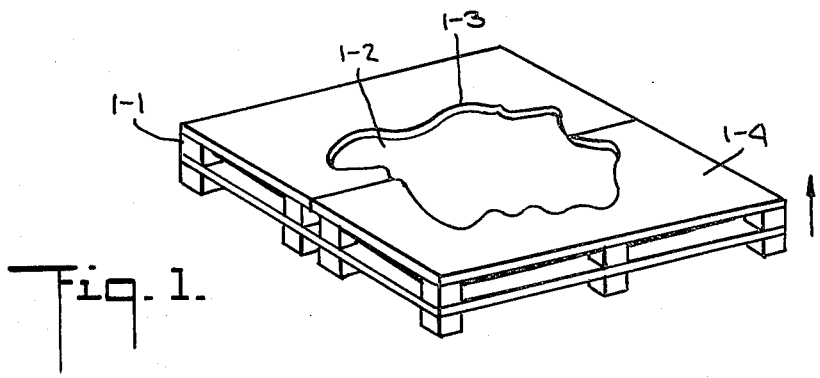
FIG. 1 is a perspective view of a segment (2 planes) of a carbonic anhydrous B model illustrating the principle of assembly of a part of a molecule.

FIG. 1 is a model of a segment of a molecule illustrating the principle of assembling only the portion of a molecule showing the open active site of the molecule with the solid plastic sheet (4) representing the space filling nature of the atoms surrounding the active site (2). The edges (3) of the cross section planes (4) define the surface of the active hole or site within the space filling part of the molecule and are held in parallel relation by an appropriate number of spacer blocks (1).

The complete model of a preselective section of the Rhizopus acid proteinase is illustrated in FIG. 2 which is a perspective view of the completed construction model wherein (2-6) identifies the 19 plane cross-section of the molecule from plane 20 through plane 38; (2-3) refers to the seam caused by the split piece used in the preferred method of construction; (2-1) refers to a spacer block separating planar cross-section (2-7) and (2-8); (2-4) refers to the edge boundary of plane (2-2) representing the contour formed by the space filling atoms adjacent the empty space represented by (2-5) and (2-9) represents plane cross-section 24 illustrated in FIG. 3.

Figure 3:
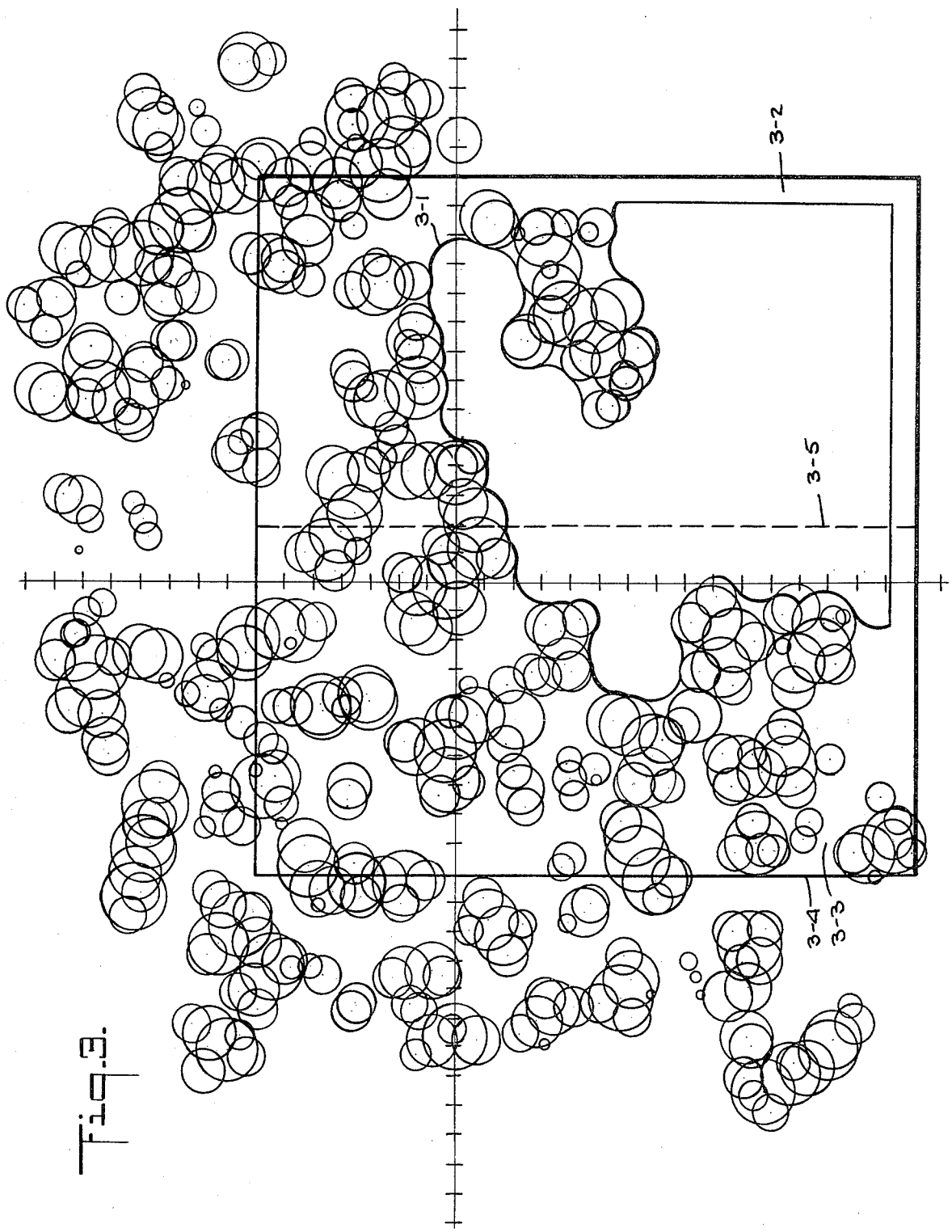
FIG. 3 is a representation of an actual plot of plane $\beta 24$ showing the outline of the cutout section surrounding the so-called active site of the molecule.

FIG. 3 represents a complete paper plot of plane $A_{24}$ of the Rhizopus acid proteinase enzyme wherein (3-1) refers to the contour line representing the boundary between relatively filled space containing the circles (3-3) representing atom intercepts; (3-4) represents the border of the section of the plane to be transferred to plastic sheet; the area marked (cutout) representing unfilled space or "active site;" (3-5) is a dotted line representing the construction split line; and (3-2) is an extension of the space filled portion serving to support one corner of the cutout piece.

What is claimed is:

1. A scale model illustrating the space filling nature of atoms in a molecular structure, comprising a plurality of adjacent parallel relatively thin rigid flat sheets, each sheet cut out to represent a cross section plane of an individual molecule having edges defining the boundary of space filling atoms intersecting said cross section, said parallel sheets ordered to represent sequential cross sectional planes of a molecular structure in axial alignment whereby said edges define a surface boundary of said molecular structure.

2. A scale model according to claim 1 wherein the adjacent cross section planes of the molecule are selected at 1 angstrom intervals and the scale of construction is 1.25 cm:1 angstrom.

* * * * *